United States Patent
Jeon et al.

(10) Patent No.: US 9,962,735 B2
(45) Date of Patent: May 8, 2018

(54) METHOD OF FORMING MULTILAYER COATING FILM MADE FROM NATURAL MATERIAL

(71) Applicants: Hyundai Motor Company, Seoul (KR); Noroobee Chemical Co., Ltd., Cheonan, Chungcheongnam-Do (KR)

(72) Inventors: Ho Tak Jeon, Gyeonggi-do (KR); Hyo Jin Lee, Gyeonggi-do (KR); Young Seok Kim, Gyeonggi-do (KR); Yong Chul Lee, Chungcheongnam-do (KR); Jae Beom Ahn, Gyeonggi-do (KR)

(73) Assignees: Hyundai Motor Company, Seoul (KR); Noroobee Chemical Co., Ltd., Cheonan, Chungcheongnam-Do (KR)

( * ) Notice: Subject to any disclaimer, the term of this patent is extended or adjusted under 35 U.S.C. 154(b) by 0 days. days.

(21) Appl. No.: 15/202,134

(22) Filed: Jul. 5, 2016

(65) Prior Publication Data
US 2017/0174929 A1 Jun. 22, 2017

(30) Foreign Application Priority Data
Dec. 16, 2015 (KR) .......... 10-2015-0180128

(51) Int. Cl.
| | | |
|---|---|---|
| *B05D 7/00* | (2006.01) | |
| *C09D 133/02* | (2006.01) | |
| *C09D 175/04* | (2006.01) | |
| *C09D 133/06* | (2006.01) | |
| *B32B 1/00* | (2006.01) | |
| *B05D 5/06* | (2006.01) | |

(52) U.S. Cl.
CPC ............ *B05D 7/53* (2013.01); *B05D 7/50* (2013.01); *B32B 1/00* (2013.01); *C09D 133/02* (2013.01); *C09D 133/066* (2013.01); *C09D 175/04* (2013.01); *B05D 5/061* (2013.01); *B05D 7/52* (2013.01); *B05D 2203/00* (2013.01)

(58) Field of Classification Search
None
See application file for complete search history.

(56) References Cited

U.S. PATENT DOCUMENTS

| | | | | |
|---|---|---|---|---|
| 2006/0193989 A1* | 8/2006 | Wegner | ........... | B05D 7/572 427/402 |
| 2011/0097482 A1* | 4/2011 | December | ........... | B05D 7/52 427/160 |
| 2012/0328893 A1* | 12/2012 | Schaller | ........... | B05D 7/08 428/537.1 |

FOREIGN PATENT DOCUMENTS

| | | | |
|---|---|---|---|
| JP | 2004-025046 A | | 1/2004 |
| KR | 10-0586272 B1 | | 5/2006 |
| KR | 2009-0003901 A | | 1/2009 |
| KR | 10-2010-0121244 A | | 11/2010 |
| KR | 10-1274752 B1 | | 6/2013 |
| KR | 2013-0062576 A | | 6/2013 |
| KR | 20130062576 A | * | 6/2013 |
| KR | 10-1353984 B1 | | 2/2014 |
| KR | 2015-0011505 A | | 2/2015 |
| KR | 10-2015-0072553 A | | 6/2015 |
| WO | 01-36552 A1 | | 5/2001 |
| WO | 2012-054547 A1 | | 4/2012 |

* cited by examiner

*Primary Examiner* — Michael P Rodriguez
(74) *Attorney, Agent, or Firm* — Mintz Levin Cohn Ferris Glovsky and Popeo, P.C.; Peter F. Corless

(57) ABSTRACT

Disclosed are a multilayer coating film made from a natural material and a method of producing the same. The multilayer coating film may be produced by forming a multilayer coating film through formation of a color coating film for providing adhesion and color to a cork on the cork material and a clear coating film for realizing texture and supplementing properties on the color coating film. As such, the multilayer coating film may be made from a natural material to diversify the color and gloss of cork as a natural material, to additionally increase marketability of an interior material and provide various appearance, to prevent discoloration due to light (e.g. UV light.) and water permeation, and to enhance durability against abrasion, scratches and the like.

2 Claims, No Drawings

METHOD OF FORMING MULTILAYER COATING FILM MADE FROM NATURAL MATERIAL

CROSS-REFERENCE TO RELATED APPLICATION

This application claims under 35 U.S.C. § 119(a) the benefit of priority to Korean Patent Application No. 10-2015-0180128 filed on Dec. 16, 2015, the entire contents of which are incorporated herein by reference.

BACKGROUND (a) Technical Field

The present invention relates to a method of forming a multilayer coating film made from a natural material. For example, the method may comprise forming a color coating film for providing adhesion and color to a cork of a substrate, and forming a clear coating film for providing texture and supplementing properties on the color coating film, thereby manufacturing the multilayer coating film on the substrate comprising the cork. As such, the multilayer coating film made from a natural material, e.g. cork, may diversify the color and gloss from a natural material (the cork), and additionally increase marketability of an interior material and provide various exteriors. In addition, the multilayer coating film may prevent discoloration due to light (e.g. UV light.) and water permeation, and enhance durability against abrasion, scratches, and the like.

(b) Background Art

Recently, materials including components containing real wood has been used to provide sophistication, luxuriousness, and the like to the exteriors of vehicles. For example, in the process of producing the interior materials containing the real wood, a base to be covered with a wood material is first laid as a base layer and then the base is covered with the real wood, followed by coating/polishing a surface of the real wood as a finishing process. Through the coating/polishing, the surface of the real wood becomes smooth and glossy and, at the same time, visual luxuriousness like wood grain may be obtained.

Cork typically provides excellent insulation, noise insulation, electric insulation, elasticity and the like with luxuriousness, which is one of the characteristics of a natural material. In addition, the cork removes superior volatile organic compounds (VOC), discharges far-infrared radiation, deodorizes, and has antibacterial function and the like. Accordingly, the cork has been used instead of conventional real wood materials.

However, such natural cork may be epidermis of a cork oak and a soft material, scratch resistance, abrasion resistance, and the like thereof may be weak. In addition, since natural cork is a wood material, it may be susceptible to discoloration by light or deformation by moisture.

Accordingly, when the natural cork is used under severe conditions as in vehicle components, a coating may be required to the surface of the natural cork. With regard to this surface-coating, there is a need for research into preventing discoloration of the natural cork due to light (e.g. UV light.) without surface luxuriousness decrease of the natural cork and enhancing durability such as scratch and abrasion resistance and gloss.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with the prior art.

Inventors of the present invention confirmed that a multilayer coating film was formed by forming a color coating film for providing adhesion and color to a cork on the cork material and forming a clear coating film for realizing texture and supplementing properties on the color coating film.

The term "cork", as used herein, refers to a material obtained from a wooden bark tissue, without particular limitation to tree species, manufacturing processes, or other chemical and physical properties thereof.

The term "color coating film", as used herein, refers to a coating film or a coating layer comprising one or more of layers that may contains a pigment reflecting or transmitting a fraction of light as the result of wavelength-selective absorption, such that the color coating film can be detected by a naked eye to have the reflected color by the pigment. As such, the color coating film may reflect the light in the wavelength depending on the pigment therein. For example, the color coating film may reflect or transmit the visible light in the range of about 300 to 800 nm, or 400 to 700 nm, which includes color ranges from red to violet. In addition, the color coating film may reflect or transmit various visible light wavelengths depending on the combination of pigments without limitation. The color coating film may entirely or partially reflect or transmit of about 10% or greater, of about 20% or greater, of about 30% or greater, of about 40% or greater, of about 50% or greater, of about 60% or greater, of about 70% or greater, of about 80% or greater, of about 90% or greater, of about 95% or greater, or of about 99% or greater of the absorbed visible light.

The term "clear coating film", as used herein, refers to a coating film or a coating layer comprising one or more of layers that may be transparent or substantially transparent. As such, the clear coating film may entirely or substantially transmit a fraction of light such as visible light having a wavelength in the range of about 300 to 800 nm. For instance, substantial amount of visible light such as, at least of about 50%, at least about 60%, at least about 70%, at least about 80%, at least about 90%, at least about 95%, or at least about 99% thereof may transmit or pass through the clear coating film of the present invention.

As such, the color and gloss of cork as a natural material may be diversified, a marketability may additionally increase from an interior material, the interior material may have various appearances, discoloration due to light (UV light, and the like) and water permeation may be prevented, and durability against abrasion, scratches, and the like may be enhanced.

In preferred aspects, the present invention provides a multilayer coating film made from a natural material such as a cork and a method of producing the same, thereby preventing discoloration due to light, water permeation, and the like of the cork material and providing durability while diversifying the color and gloss of the cork material.

In one aspect, the present invention provides a multilayer coating film made from a natural material. Preferably, the multilayer coating film may comprise a natural cork material including a base layer, a non-woven fabric layer, and a cork layer. In an exemplary embodiment, the multilayer coating film may comprise: a base layer, a non-woven fabric layer, and a cork layer that may comprise a color coating composition and a clear coating composition. In particular, the color coating composition may be coated on the cork layer to form a color coating film and the clear coating composition may be coated on the color coating film to form a clear coating film. The color coating composition may comprise a waterborne polyurethane resin, a waterborne acrylic resin, a coloring pigment, a wetting agent, a defoaming agent, a hardening accelerator, a light stabilizer, a thickener, and a solvent, and the clear coating composition may comprise an acrylic resin, a polyester polyol, a reaction catalyst, a wetting additive, a light stabilizer, a quencher, a hardener, and a solvent.

Preferably, a thickness of the color coating film may be of about 5 to 10 μm and a thickness of the clear coating film may be of about 25 to 35 μm.

Preferably, the color coating composition may comprise an amount of about 30 to 50% by weight of the waterborne polyurethane resin, an amount of about 10 to 30% by weight of the waterborne acrylic resin, an amount of about 0.3 to 5% by weight of the coloring pigment, an amount of about 0.1 to 1.0% by weight of the wetting agent, an amount of about 0.1 to 2.0% by weight of the defoaming agent, an amount of about 0.01 to 1.0% by weight of the hardening accelerator, an amount of about 0.5 to 5.0% by weight of the light stabilizer, an amount of about 0.1 to 3.0% by weight of the thickener, and an amount of about 5 to 30% by weight of the solvent, all the % by weight based on the total weight of the color coating composition.

Preferably, the clear coating composition may comprise an amount of about 20 to 40% by weight of the acrylic resin, an amount of about 5 to 15% by weight of the polyester polyol, an amount of about 0.1 to 1.5% by weight of the reaction catalyst, an amount of about 0.1 to 1.0% by weight of the wetting additive, an amount of about 1.0 to 2.0% by weight of the light stabilizer, an amount of about 1.0 to 5.0% by weight of the quencher, an amount of about 10 to 20% by weight of the hardener, and an amount of about 25 to 30% by weight of the solvent, all the % by weight based on the total weight of the clear coating composition.

For the color coating composition, the waterborne polyurethane resin may comprise an amount of about 20 to 40% by weight of a solid content based on the total weight of the waterborne polyurethane resin, and the waterborne polyurethane resin has pH of about 6 to 10.

Preferably, the waterborne polyurethane resin may comprise an amount of about 5 to 30% by weight of isocyanate, an amount of about 2 to 10% by weight of hydrophilic polyol, an amount of about 30 to 60% by weight of polycarbonate diol, an amount of about 5 to 25% by weight of a solvent, and an amount of about 1 to 5% by weight of a neutralizer, all % by weights based on the total weight of the waterborne polyurethane resin.

For the color coating composition, the waterborne acrylic resin may have pH of about 7 to 10 and a viscosity of about 300 to 1,000 mPa·s.

Preferably, the waterborne acrylic resin may comprise an amount of about 50 to 80% by weight of a methacrylic monomer having an aliphatic group, an amount of about 5 to 20% by weight of a methacrylic monomer having a hydroxyl group, an amount of about 3 to 10% by weight of a methacrylic monomer having an acid radical, and an amount of about 10 to 20% by weight of an acrylic monomer, all the % by weight based on the total weight of the waterborne acrylic resin.

For the color coating composition, an average particle size of the coloring pigment may suitably be of about 1 to 10 μm.

For the color coating composition, the wetting agent may be one or more selected from the group consisting of siloxane modified with polyether, a polyether-siloxane copolymer, polydimethyl siloxane, and polydimethylsiloxane modified with polyether.

For the color coating composition, the hardening accelerator may be one or more selected from the group consisting of trimethylene diamine, stannous octoate, dibutyltin dilaurate, and lead 2-ethylhexonate.

For the color coating composition, the light stabilizer may suitably be one or more selected from the group consisting of benzophenones, oxanilides, benzotriazoles, triazines, 4-benzoyloxy-2,2,6,6-tetramethylpiperidin, and 2,4-di-tert-butylphenyl-3,5-di-tert-butyl-hydroxybenzoid.

For the color coating composition, the thickener may be one or more selected from the group consisting of acrylic thickeners, urethane, and ethylene-vinyl acetate.

In addition, for the clear coating composition, the acrylic resin may suitably have an acid value of about 3 to 10 mg/KOH, may comprise a hydroxyl group in a content of about 1 to 3%, and may suitably have a glass transition temperature of about 40 to 50° C. and a weight-average molecular weight (Mw) of about 6,000 to 15,000.

For the clear coating composition, the polyester polyol may comprise a hydroxyl group in a content of about 4 to 6% and suitably may have a weight-average molecular weight (Mw) of about 3,000 to 10,000.

For the clear coating composition, the reaction catalyst may preferably be dibutyltin dilaurate.

For the clear coating composition, the wetting additive may preferably be a polydimethylsiloxane-based material.

In another aspect, provided is a method of producing a multilayer coating film. In an exemplary embodiment, the method may comprise: providing a cork layer; coating a color coating composition on the cork layer to form a color coating film; and coating a clear coating composition on the color coating film to form a clear coating film. Particularly, the color coating composition may comprise an amount of about 30 to 50% by weight of the waterborne polyurethane resin, an amount of about 10 to 30% by weight of the waterborne acrylic resin, an amount of about 0.3 to 5% by weight of the coloring pigment, an amount of about 0.1 to 1.0% by weight of the wetting agent, an amount of about 0.1 to 2.0% by weight of the defoaming agent, an amount of about 0.01 to 1.0% by weight of the hardening accelerator, an amount of about 0.5 to 5.0% by weight of the light stabilizer, an amount of about 0.1 to 3.0% by weight of the thickener, and an amount of about 5 to 30% by weight of the solvent, all the % by weight based on the total weight of the color coating composition. In addition, the clear coating composition may comprise an amount of about 20 to 40% by weight of the acrylic resin, an amount of about 5 to 15% by weight of the polyester polyol, an amount of about 0.1 to 1.5% by weight of the reaction catalyst, an amount of about 0.1 to 1.0% by weight of the wetting additive, an amount of about 1.0 to 2.0% by weight of the light stabilizer, an amount of about 1.0 to 5.0% by weight of the quencher, an amount of about 10 to 20% by weight of the hardener, and an amount of about 25 to 30% by weight of the solvent, all the % by weight based on the total weight of the clear coating composition.

Preferably, a thickness of the color coating film may be of about 5 to 10 μm and a thickness of the clear coating film may be of about 25 to 35 μm.

Further provided in the present invention is a vehicle that may comprise the multilayer coating film as described herein.

Other aspects and preferred embodiments of the invention are discussed infra.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a multilayer coating film made from a natural material using a natural cork material including a base layer, a non-woven fabric layer, and a cork layer, and a method of producing the same.

The multilayer coating film may include a base layer, a non-woven fabric layer, and a cork layer that may comprise a color coating composition on the cork layer to form a color coating film; and coating a clear coating composition on the color coating film to form a clear coating film. In particular, the color coating composition may include a waterborne polyurethane resin, a waterborne acrylic resin, a coloring pigment, a wetting agent, a defoaming agent, a hardening accelerator, a light stabilizer, a thickener, and a solvent, and the clear coating composition may comprise an acrylic resin, a polyester polyol, a reaction catalyst, a wetting additive, a light stabilizer, a quencher, a hardener, and a solvent.

In particular, the multilayer coating film according to the present invention may comprise the color coating film such that the color of cork may be diversified and discoloration due to vulnerability to light (UV light, etc.) may be prevented. In addition, since a surface of the natural material may be protected by the clear coating film, durability against scratches, abrasion, and the like may be increased. In addition, surface gloss may be controlled, and various appearances may be obtained.

Preferably, the thickness of the color coating film may be of about 5 to 10 μm and the thickness of the clear coating film may be of about 25 to 35 μm. In particular, when the thickness of the color coating film is less than about 5 μm, light resistance may not be secured. When the thickness of the color coating film is greater than about 10 μm, unique cork decoration is concealed and thus characteristics of the cork material may be damaged. In addition, when the thickness of the clear coating film is less than about 25 μm, reliability may not be secured. When the thickness of the clear coating film is greater than about 35 μm, clear gloss may increase and thus the characteristics of the cork material may be damaged.

Preferably, when the clear coating film is formed, the clear coating may be performed twice or greater times to form a multilayer clear coating film. When the clear coating is performed once, surface performance may be decreased because the cork layer material absorbs the clear coating composition. Therefore, the clear coating may be preferably performed twice or greater times.

Preferably, the color coating composition may include an amount of about 30 to 50% by weight of the waterborne polyurethane resin, an amount of about 10 to 30% by weight of the waterborne acrylic resin, an amount of about 0.3 to 5% by weight of the coloring pigment, an amount of about 0.1 to 1.0% by weight of the wetting agent, an amount of about 0.1 to 2.0% by weight of the defoaming agent, an amount of about 0.01 to 1.0% by weight of the hardening accelerator, an amount of about 0.5 to 5.0% by weight of the light stabilizer, an amount of about 0.1 to 3.0% by weight of the thickener, and an amount of about 5 to 30% by weight of the solvent. All the % by weight are based on the total weight of the color coating composition.

The waterborne polyurethane resin as used herein may provide flexibility and particularly impact resistance and adhesion. In the waterborne polyurethane resin, the content of solid may be in an amount of about 20 to 40% by weight, or particularly an amount of about 30% by weight based on the total weight of the waterborne polyurethane resin. In addition, pH of the waterborne polyurethane resin may be of about 6 to 10, or of about 7.5 to 8.5. Further, the waterborne polyurethane resin may have a tensile strength of about 5 to 35 mPa and a fracture elongation of about 600 to 800%.

In addition, the waterborne polyurethane resin may be used in an amount of 30 to 50% by weight based on the total of the color coating composition. When the content of the waterborne polyurethane resin is less than about 30% by weight, coating film properties such as adhesion and sunscreen resistance may deteriorate. When the content of the waterborne polyurethane resin is greater than about 50% by weight, coating workability may be decreased due to a resin with high molecular weight, and thus, appearance deteriorates.

Preferably, the waterborne polyurethane resin may include an amount of about 5 to 30% by weight of isocyanate, an amount of about 2 to 10% by weight of hydrophilic polyol, an amount of about 30 to 60% by weight of polycarbonate diol, an amount of about 5 to 25% by weight of a solvent, and an amount of about 1 to 5% by weight of a neutralizer, based on the total weight of the waterborne polyurethane resin.

Preferably, the number of functional groups of the isocyanate may be two or greater on average. The isocyanate may include one or more selected from toluene diisocyanate, 4,4-diphenyl methane diisocyanate, hexamethylene diisocyanate, isophorone diisocyanate, dicyclohexylmethane diisocyanate, and polyfunctional isocyanates, or derivatives thereof. Preferably, the isocyanate may be isophorone diisocyanate, dicyclohexylmethane diisocyanate, or a mixture thereof.

The number of functional groups of the hydrophilic polyol may be two or greater on average. The hydrophilic polyol as used herein may provide hydrophilicity to a urethane chain to facilitate water dispersion. The hydrophilic polyol may include one or more selected from dimethylpropionic acid, dimethylbutanoic acid, polyoxyethylene glycol, polycaprolactone diol having a carboxylic group at a side chain thereof, polyether diol having a sulfonic acid group at a side chain thereof, polyol having a polyoxyethylene group substituted with an alkoxy group at a side chain thereof, and carbonate diol. In particular, when the polycarbonate diol has a weight-average molecular weight (Mw) of 500 to 5,000, impact resistance and adhesion may be advantageously secured.

Preferably, the waterborne acrylic resin may be prepared by preparing a polymer through radical-polymerization of various monomers having a vinyl-type double bond of acrylic ester or methacrylic ester in a solution using a thermal decomposition initiator and then neutralizing acidity with amine, and the like followed by dispersing the polymer in water.

In addition, the waterborne acrylic resin with low viscosity may provide superior workability upon coating, adhesion, moisture resistance, and light resistance. In the waterborne acrylic resin, the content of a solid may be of about 50% by weight. In addition, the waterborne acrylic resin may have pH of about 7 to 10 and a viscosity of about 300 to 1,000 mPa·s. The waterborne acrylic resin may be used as a one-component lacquer not including a hardener. The waterborne acrylic resin may be used in an amount of about 10 to 30% by weight based on the total of the color coating composition. When the content of the waterborne acrylic resin is less than about 10% by weight, coating film properties such as adhesion, sunscreen resistance, and light resistance may deteriorate. When the content of the waterborne acrylic resin is greater than about 30% by weight, impact resistance may be decreased.

Preferably, the waterborne acrylic resin may include an amount of about 50 to 80% by weight of a methacrylic monomer having an aliphatic group, an amount of about 5 to 20% by weight of a methacrylic monomer having a hydroxyl group, an amount of about 3 to 10% by weight of a methacrylic monomer having an acid radical, and an amount of about 10 to 20% by weight of an acrylic monomer, based on the total weight of the waterborne acrylic resin.

The methacrylic monomer having an aliphatic group may include one or more selected from the group consisting of butylmethacrylate, methylmethacrylate, ethylmethacrylate, 2-ethylhexylmethacrylate, laurylmethacrylate, isobornyl methacrylate, and cyclohexyl methacrylate may be used. In addition, the acrylic monomer having an aliphatic group may be butylacrylate, ethylacrylate, 2-ethylhexylacrylate, or a mixture thereof.

In addition, the methacrylic monomer having a hydroxyl group may be 2-hydroxyethylmethacrylate, 2-hydroxypropylmethacrylate, or a mixture thereof, and the methacrylic monomer having a carboxylic group may be methacrylate. In addition, the radical initiator may include one or more selected from the group consisting of t-butylperoxybenzoate, t-butylperoxy-2-ethylhexanoate and t-amylperoxy-2-ethylhexanoate. In addition, a polymerizable radical initiator as an organic peroxide may be used alone or a mixture of two or more polymerizable radical initiators may be used. In addition, the amine may be N-methyldiethanolamine, triethanolamine, or the like.

For example, the methacrylic monomer with an aliphatic group, the methacrylic monomer having a hydroxyl group, and the acrylic monomer initiator may be polymerized at a temperature of about 100 to 130° C. for about 8 to 11 hours while adding dropwise over about 2 to 5 hours in the aforementioned composition ratio. Subsequently, a resultant product is cooled to a temperature of about 70° C. or less and then amine may be fed thereinto, followed by maintaining a reaction state for about 30 minutes to 1 hour. Subsequently, a resultant product may be dispersed in water.

Preferably, an average particle size of the coloring pigment may be of about 1 to 10 μm which may have a size less than those of conventional pigments. In addition, since the coloring pigment may have high coloring strength and superior penetrability, patterns of the cork material may be easily highlighted. When the coloring pigment has an average particle size of less than about 1 μm, transparency may be decreased. When the coloring pigment has an average particle size of greater than about 10 μm, stains may be generated during coating. The coloring pigment has an average particle size of about 1 to 5 μm, or particularly of about 3 μm.

In addition, the coloring pigment may be used in an amount of about 0.3 to 5% by weight based on a total of the color coating composition. When the content of the coloring pigment is less than about 0.3% by weight, color is not easily realized. When the content of the coloring pigment is greater than about 5% by weight, concealment force increases and thus unique patterns of the material may not be sufficiently obtained.

The wetting agent as used herein may increase wettability by decreasing the surface tension of water based paint, prevents cratering, and provides a slip property to a surface. The wetting agent may include one or more selected from the group consisting of siloxane modified with polyether, a polyether-siloxane copolymer, polydimethyl siloxane, and polydimethylsiloxane modified with polyether.

The defoaming agent as used herein may be a non-silicon-based agent and may prevent appearance defects by destroying bubbles during coating material preparation and coating. The defoaming agent may be used in an amount of about 0.1 to 2.0% by weight based on the total of the color coating composition. When the content of the defoaming agent is less than about 0.1% by weight, defoaming effects may not be sufficient. When the content of the defoaming agent is greater than about 2.0% by weight, adhesion may be decreased upon re-coating.

The hardening accelerator may include one or more selected from the group consisting of trimethylene diamine, stannous octoate, dibutyltin dilaurate, and lead 2-ethylhexonate. The hardening accelerator as a urethane reaction catalyst may increase a reaction rate between a main material (hydroxyl group) and a hardener (isocyanate). When the hardening accelerator is added in a greater than the predetermined amount, for example, greater than about 1% by weight based on the total weight of the color coating composition, pot life may be decreased and thus workability may be decreased.

The light stabilizer may be one or more selected from the group consisting of benzophenones, oxanilides, benzotriazole, triazine, 4-benzoyloxy-2,2,6,6-tetramethylpiperidine, and 2,4-di-tert-butylphenyl-3,5-di-tert-butyl-hydroxybenzoid. The light stabilizer prevents aging, color change, and the like of a coating film due to long-term exposure to light.

The thickener may prevent precipitation during storage of a coating material and may effectively prevent flowing of a coating material during coating. The thickener may be one or more selected from the group consisting of acrylic thickeners, urethane, and ethylene-vinyl acetate.

The solvent may be preferably distilled water. When distilled water is used as the solvent, viscosity may be controlled during coating and thus coating workability may be enhanced.

Preferably, the clear coating composition may include an amount of about 20 to 40% by weight of the acrylic resin, an amount of about 5 to 15% by weight of the polyester polyol, an amount of about 0.1 to 1.5% by weight of the reaction catalyst, an amount of about 0.1 to 1.0% by weight of the wetting additive, an amount of about 1.0 to 2.0% by weight of the light stabilizer, an amount of about 1.0 to 5.0% by weight of the quencher, an amount of about 10 to 20% by weight of the hardener, and an amount of about 25 to 30% by weight of the solvent, all the % by weight based on the total weight of the clear coating composition.

The acrylic resin may include a solid in an amount of about 60% by weight or greater, may have an acid value of about 3 to 10 mg/KOH, may include a hydroxyl group in an amount of about 1 to 3%, and may have a glass transition temperature of about 40 to 50° C. to minimize stickiness of a coating film. In addition, the acrylic resin may have a weight-average molecular weight (Mw) of about 6,000 to 15,000. The acrylic resin may be used in an amount of about 20 to 40% by weight based on the total of the clear coating composition. When the content of the acrylic resin is less than about 20% by weight, chemical resistance (sunscreen resistance) and a thermal cycle of a formed coating film may be decreased. When the content of the acrylic resin is greater than about 40% by weight, flexibility and impact resistance may be decreased and particularly a coating film may crack due to lack of flexibility.

The acrylic resin may be prepared in a polymer by radical-polymerizing various monomers having a double bond such as an acrylic monomer and a vinyl-based monomer in a solution using a thermal decomposition initiator. In particular, the acrylic or vinyl-based monomer may be a non-functional monomer, e.g., methylacrylate, ethylacrylate, isopropylacrylate, N-butylacrylate, ethylhexylacrylate, methylmethacrylate, ethylmethacrylate, butylmethacrylate, hexylmethacrylate, lauryl methacrylate, and the like. In addition, examples of a monomer having a carboxyl functional group may include acrylic acid, methacrylic acid, maleic acid, itaconic acid, chronic acid, and the like. Examples of a monomer having a hydroxyl group may include 2-hydroxymethacrylate, hydroxypropylacrylate, 4-hydroxybutylacrylate, 2-hydroxyethylacrylate, and the like. In addition, examples of a vinyl-based monomer may include acrylamide, N-methylolacrylamide, glycidylmethacrylate, styrene, vinyl toluene, acrylonitrile, vinyl acetate, and the like.

The polyester polyol may include a solid in a content of about 80% by weight and a hydroxyl group in a content of about 4 to 6%, and may have a weight-average molecular weight (Mw) of about 3,000 to 10,000. Since the polyester polyol may have a relatively large hydroxyl group, crosslinking density may increase when reacting with isocyanate and thus moisture resistance may be supplemented. The polyester polyol may be used in an amount of about 5 to 15% by weight based on a total of the clear coating composition. When the content of polyester polyol is less than about 5% by weight, moisture resistance may be slightly enhanced. When the content of polyester polyol is greater than about 15% by weight, hardness of the coating film may be decreased and surface stickiness may occur.

The polyester polyol may be esterified. For example, an acidic ingredient, a polyhydric alcohol ingredient, a catalyst, and various additives may be added to a reactor equipped with a stirrer. While maintaining the reactor at a temperature of about 200 to 230° C., a condensed low-molecular-weight ester byproduct may be removed to the outside and, at the same time, the polyester polyol may be esterified. Here, the reaction may terminated based on a time point when a conversion rate in the esterification is generally about 95% or greater based on a theoretical outflow amount of the low-molecular-weight ester byproduct. When esterification is terminated, polyester condensation reaction may be induced while elevating the temperature of the reactor to a temperature of about 250 to 280° C. This condensation reaction may be terminated when an acid value is about 2 to 4 mg KOH/g or less. As a result, a polyester resin may be produced.

Preferably, the reaction catalyst may be dibutyltin dilaurate.

Preferably, the wetting additive may be a polydimethylsiloxane-based substance as a substance to enhance wettability during coating and leveling properties of a coating film.

The light stabilizer may be a UV absorbent and may increase light resistance. The light stabilizer may preferably be a mixture of UVA (benzophenone group or triazole group) and HALS (4-amino-2,2,6,6-tetramethyl piperidine or 4-hydroxy-2,2,6,6-tetramethyl piperidine).

The quencher may suitably have a particle size of about 1.0 to 2.0 µm, and may have superior penetrability, and hydrophobic properties. Accordingly, the quencher as used herein may not absorb moisture, thereby having superior moisture resistance. In addition, when subjected to a flexibility test, the coating film may not be whitened due to small particles of the quencher. When the particle size of the quencher is less than about 1% by weight, quenching effects may not be expected. When the particle size of the quencher is greater than about 5% by weight, gloss may be reduced and thus the characteristics of the cork material may not remain.

The hardener may preferably be a hexamethylene diisocyanate trimer having superior non-yellowing properties and weather resistance.

The solvent may be preferably an ester-based solvent, a ketone-based solvent, or a mixture thereof, and the solvent, may exclude a hydrocarbon-based substance. The solvent as used herein may facilitate coating. In addition, the smoothness and appearance of the coating film may be controlled by adjusting the volatilization rate of the solvent.

The method of producing the multilayer coating film as described herein may comprise: providing a cork layer; coating a color coating composition on the cork layer to form a color coating film; and coating a clear coating composition on the color coating film to form a clear coating film.

Particularly, In particular, the color coating composition may include a waterborne polyurethane resin, a waterborne acrylic resin, a coloring pigment, a wetting agent, a defoaming agent, a hardening accelerator, a light stabilizer, a thickener, and a solvent, and the clear coating composition may comprise an acrylic resin, a polyester polyol, a reaction catalyst, a wetting additive, a light stabilizer, a quencher, a hardener, and a solvent. Contents of the components are described above.

Preferably, a thickness of the color coating film may be of about 5 to 10 μm and a thickness of the clear coating film may be of about 25 to 35 μm.

According to various exemplary embodiments of the present invention, the multilayer coating film made from a natural material may provide diversified color and gloss of the cork as the natural material. The method of producing the multilayer coating film may include, in particular, forming the color coating film, which provides adhesion to the cork material and color, on the cork material and forming the clear coating film, which provides texture and supplement property, on the color coating film. As such, the multilayer coating film and the method of producing thereof as described herein may increase marketability of an interior material and realize various appearance effects.

In addition, the multilayer coating film may be formed by using the color coating composition and the clear coating composition, which may be suitably prepared through mixing of the components in exemplary ratio, discoloration, water permeation, and the like due to light (e.g., UV light) may be prevented and durability against abrasion, scratches, and the like may be enhanced.

EXAMPLES

The following examples illustrate the invention and are not intended to limit the same.

Example 1

Using ingredients in ratios summarized in the following Table 1, a color coating composition and a clear coating composition (two-component oil-based compositions) were prepared according to a general method. In particular, the color coating composition was a liquid-type water-based coating material, and the viscosity thereof was adjusted using water, as a diluent, without a hardener.

In addition, a base layer (lower layer), a non-woven fabric layer (middle layer), and a cork layer (upper layer) were sequentially stacked to manufacture a film made from a natural material.

Subsequently, the upper layer, i.e., the cork layer, of the film made from the natural material was spray-coated with the color coating composition. In particular, the viscosity of the color coating composition was adjusted to about 15.0 to 17.0 sec (FordCup #4) and then the color coating was spray-coated to form a color coating layer having a thickness of about 10 μm. Next, the color coating film was dried at room temperature for 10 minutes.

Subsequently, the viscosity of the clear coating composition was diluted to about 13.0 to 15.0 sec (FordCup #4) with a solvent and then spray-coated on the color coating film, thereby forming a first clear coating film with a thickness of 30 μm. Next, the first clear coating film was dried at a temperature of 80° C. for 30 minutes. Subsequently, the clear coating composition was coated on the first clear coating film according to the aforementioned method, thereby forming a second clear coating film. Subsequently, secondary drying was performed at a temperature of 80° C. for 30 minutes. With regard to hardening (coating film formation), a 3 coat 2 baking system was applied.

Composition (1) Color Coating Composition

1) Waterborne polyurethane including 15% by weight of isocyanate, 7% by weight of hydrophilic polyol, 50% by weight of polycarbonate diol, 25% by weight of solvent, and 3% by weight of neutralizer based on the total weight of the waterborne polyurethane (manufactured by NRB)

2) Waterborne acrylic resin including 71% by weight of methacrylic monomer with an aliphatic group, 9% by weight of methacrylic monomer with a hydroxyl group, 5% by weight of methacrylic monomer with an acid radical, 12% by weight of acrylic monomer, 2% by weight of initiator, and 1% by weight of amine, based on the total weight of the waterborne acryl resin, and having 50% by weight of solid, pH of 8, and a viscosity of 1,000 to 1,200 mPa·s (manufactured by NRB)

3) Coloring pigment having an average particle size of 5 μm, and MICROLIPH was used (manufactured by BASF).

4) As other additives of the color coating composition, 1% by weight of wetting agent, 2% by weight of defoaming agent, 1% by weight of hardening accelerator, 5% by weight of light stabilizer, and 3% by weight of thickener were added. The content of a solvent was controlled depending upon of the content of the coloring pigment such that the total amount of the color coating composition was 100% by weight.

(2) Clear Coating Composition

1) Acrylic resin: N3-0540 (manufactured by NRB)

2) Polyester polyol: K6-0670 (manufactured by NRB)

3) Hydrophobic quencher: Hydrophobic silica with an average particle size of 1.0 to 2.0 μm was used 4) As other additives of the clear coating composition, 1.5% by weight of reaction catalyst (dibutyltin dilaurate), 1% by weight of wetting additive (BYK-306), 2% by weight of light stabilizer (mixture of Tinuvin 479 (UVA) and Tinuvin 1130 (UVA)), and 20% by weight of hardener (HI-100, manufactured by BASF) were added. The amount of a solvent was adjusted depending upon the content of the hydrophobic quencher such that the total amount of the clear coating composition was 100% by weight.

Example 2 and Comparative Examples 1 to 9

Components and ratios summarized in the following Table 1 were used, and a multilayer coating film including a color coating film and a clear coating film was formed on a cork layer of a natural material film in the same manner as in Example 1.

TABLE 1

| | | Ingredients | | | | | |
|---|---|---|---|---|---|---|---|
| | | Color coating composition (coating once in total) | | | Clear coating composition (coating twice in total) | | |
| Classification | | Waterborne polyurethane | Waterborne acrylic resin | Coloring pigment | Acrylic resin | Polyester polyol | Hydrophobic quencher |
| Three-layer coat | Comparative Example 1 | 20 | 40 | 1 | 15 | 30 | 3 |
| | Comparative Example 2 | 60 | 0 | 1 | 45 | 0 | 3 |
| | Comparative Example 3 | 40 | 20 | — | 30 | 15 | 3 |
| | Comparative Example 4 | 40 | 20 | 6 | 30 | 15 | 3 |
| | Comparative Example 5 | 40 | 20 | 1 | 15 | 30 | 3 |
| | Comparative Example 6 | 40 | 20 | 1 | 30 | 15 | — |
| | Comparative Example 7 | 40 | 20 | 1 | 30 | 15 | 6 |
| | Comparative Example 8 | 40 | 20 | 1 | — | — | — |
| | Comparative Example 9 | — | — | — | 30 | 15 | 3 |
| | Example 1 | 40 | 20 | 1 | 30 | 15 | 3 |
| | Example 2 | 30 | 30 | 1 | 40 | 5 | 3 |

Experimental Example

Properties such as initial adhesion, impact resistance, sunscreen resistance, heat-resistance, moisture resistance, and light resistance of the natural material films having the multilayer coating film formed thereon manufactured according to Examples 1 and 2 and Comparative Examples 1 to 9 were evaluated. Results are summarized in Table 2 below.

[Measurement Methods]

(1) Appearance of cork material: The patterns of the cork material were observed with the naked eye after the color coating (Levels 1 to 5), Level 1 (patterns are not shown), Level 5 (clear patterns are observed)→Level 4 or more were determined to be satisfactory.

(2) Gloss: Measured at 60° using a gloss meter manufactured by BYK GARDNER. When gloss was 5.0 or greater, the unique texture of cork was decreased due to high gloss. When gloss is 3.0 or less, strong quenching effect was exhibited and thus the texture of cork was not felt.

(3) Initial adhesion: Dotted lines were drawn across a coating film surface with a cutter such that the dotted lines were also drawn across a base material, thereby preparing 100 square cells with a size of 2 mm×2 mm. An adhesive cellophane tape was attached to the square cells and then it was rapidly peeled from the square cells at 90°. Subsequently, the number of the coating films remaining in the cells was evaluated.

(4) Impact resistance: A 0.5 Kg weight was dropped from a height of 20 cm by means of an ISO 6272 falling weight sensitivity tester to evaluate breakage and appearance of a coating film.

(5) Sunscreen resistance: The natural material film was coated with predetermined sunscreen and then stood at a temperature of 80° C. in an oven for one hour. The natural material film was taken out of the oven and subjected to appearance evaluation and adhesion tests.

(6) Heat resistance: A test piece was stood at a temperature of a 90±2° C. in a chamber for 300 hours. Subsequently, the test pieces were taken out of the chamber and subjected to appearance evaluation and adhesion tests.

(7) Moisture resistance: A test piece was stood for 240 hours in a chamber with a test temperature of 50±2° C. and a relative humidity of 95±2% RH. Subsequently, the test piece was taken out of the chamber and subjected to appearance evaluation and initial adhesion tests.

(8) Light resistance: Light was irradiated to a coating specimen until a total accumulated light amount was 700 kJ/m² using a xenon arc lamp under conditions of a black panel temperature of 89±3° C., an interior humidity of 50±5% RH, and an irradiation illumination of 0.55±0.02 W/m² (340 nm). Subsequently, the specimen was taken out of the xenon arc lamp and washed with a neutral aqueous detergent. The washed specimen was dried and subjected to appearance evaluation and initial adhesion tests.

(※ Gray scale: Level 1 (discoloration is severe, bad) to 5 (No discoloration, good))

TABLE 2

| Classification | | Cork material pattern | Gloss | Initial adhesion | Impact resistance | Sunscreen resistance | Heat-resistance | Moisture resistance | Light resistance |
|---|---|---|---|---|---|---|---|---|---|
| Three-layer coat | Comparative Example 1 | 4 | 3.5 | 90/100 | N.G (broken) | N.G (peeled) | N.G (peeled) | N.G (peeled) | N.G (peeled) |
| | Comparative Example 2 | 4 | 3.5 | 80/100 | N.G (broken) | N.G (peeled) | N.G (peeled) | N.G (peeled) | N.G (peeled) |
| | Comparative Example 3 | 5 | 3.5 | 100/100 | Satisfactory | Satisfactory | Satisfactory | Satisfactory | N.G (discoloration, Level 1) |

TABLE 2-continued

| Classification | Cork material pattern | Gloss | Initial adhesion | Impact resistance | Sunscreen resistance | Heat-resistance | Moisture resistance | Light resistance |
|---|---|---|---|---|---|---|---|---|
| Comparative Example 4 | 1 | 3.0 | 100/100 | Satisfactory | Satisfactory | Satisfactory | Satisfactory | Level 4 |
| Comparative Example 5 | 4 | 3.5 | 100/100 | Satisfactory | N.G (swelled) | Satisfactory | N.G | N.G (discoloration, Level 2) |
| Comparative Example 6 | 4 | 85 | 100/100 | Satisfactory | Satisfactory | Satisfactory | Satisfactory | Level 3 |
| Comparative Example 7 | 2 | 1.0 | 100/100 | N.G (whitened) | Satisfactory | Satisfactory | Satisfactory | Level 3 |
| Comparative Example 8 | 4 | 35 | 100/100 | Satisfactory | N.G (discoloration) | Satisfactory | Satisfactory | N.G (discoloration, Level 2) |
| Comparative Example 9 | 5 | 3.5 | N.G (peeled) | Satisfactory | N.G (swelled) | N.G (peeled) | N.G (peeled) | N.G (peeled) |
| Example 1 | 4 | 3.5 | 100/100 | Satisfactory | Satisfactory | Satisfactory | Satisfactory | Level 5 |
| Example 2 | 4 | 3.5 | 100/100 | Satisfactory | Satisfactory | Satisfactory | Satisfactory | Level 5 |

As shown in Table 2, it can be confirmed that, in the case of Comparative Example 1 in which the content of the waterborne polyurethane in the color coating composition and the content of the acrylic resin in clear coating composition were low, initial adhesion was not expressed, the results of the tests related to adhesion (sunscreen resistance, heat-resistance, moisture resistance, and light resistance) were all poor, and, the coating film was broken after impact since hardness increased when the content of the waterborne acrylic resin increased.

In addition, it can be confirmed that, in the case of Comparative Example 2 in which the content of the waterborne polyurethane in the color coating composition and the content of the acrylic resin in the clear coating composition were high, initial adhesion was not expressed, and the results of tests for evaluating adhesion (sunscreen resistance, heat-resistance, moisture resistance, and light resistance) were all unsatisfactory. In particular, it can be confirmed that, when the content of the acryl used in the clear coating composition was high, a breakage phenomenon occurred in an impact resistance evaluation test.

In addition, it can be confirmed that, in the case of Comparative Example 3 in which the coloring pigment was not used in the color coating composition, the clearest cork patterns were exhibited, but the poorest discoloration was exhibited in the light resistance test.

In addition, it can be confirmed that, in the case of Comparative Example 4 in which the content of the coloring pigment was high in the color coating composition, lowest discoloration was exhibited in the light resistance test, but cork patterns were concealed due to increased concealment force, whereby the texture of cork, as a natural material, was decreased.

In addition, it can be confirmed that, in the case of Comparative Example 5 in which the content of the color coating composition was proper and the content of the polyester in the clear coating composition increases, sunscreen resistance was decreased.

In addition, it can be confirmed that, in the case of Comparative Example 6 in which the content of the hydrophobic quencher in the clear coating composition was low or the hydrophobic quencher was not used in the clear coating composition, gloss increased and thus natural cork feeling decreased.

In addition, it can be confirmed that, in the case of Comparative Example 7 in which the content of the hydrophobic quencher used in the clear coating composition was increased, gloss was too low and thus cork feeling was decreased due to rough texture. Here, a gloss range in which feeling of a natural cork material was exhibited is 3.0 to 4.0 (60 degree). In addition, it can be confirmed that, when the quencher was used in an excessively large amount or a quencher with a large particle size is used, whitening occurred after the impact resistance evaluation.

Further, in the cases of Comparative Examples 8 and 9 in which the color coating film or the clear coating film was respectively, separately formed, sunscreen resistance and light resistance were poor when only the color coating film was coated, and adhesion to the material was not good when only the clear coating film was coated.

On the other hand, it can be confirmed that, in the cases of Examples 1 and 2, properties such as adhesion were satisfied when the waterborne polyurethane and the waterborne acrylic resin were used within the aforementioned range in the color coating composition, and light resistance was satisfied without deterioration of natural cork feeling when the coloring pigment was used. In addition, in the case of clear coating composition, sunscreen resistance, heat-resistance, moisture resistance, and light resistance were satisfied when the newly synthesized acrylic resin and the polyester polyols were used within the aforementioned range, and realization of natural cork feeling were maximized when the hydrophobic quencher was used.

Therefore, it can be confirmed that, by applying the color coating film to the natural material film having the multilayer coating film manufactured according to Examples 1 and 2, the color of the cork may be diversified, and discoloration of the natural film material due to vulnerability to light (UV light, etc.) may be prevented. In addition, since a surface of the natural material film is protected by applying the clear coating film, durability against scratches, abrasion and the like may be increased. In addition, gloss may be controlled, thereby realizing various appearance effects.

As apparently demonstrated from the foregoing, the present invention advantageously provides a multilayer coating film and a method of forming the multilayer coating film made from a natural material to diversify the color and gloss of cork as a natural material. In addition, the multilayer coating film may obtain a marketability increase of an interior material and provide various appearances to the interior material, by forming the multilayer coating film through formation of a color coating film for providing adhesion and color to a cork on the cork material and a clear coating film for realizing texture and supplementing properties on the color coating film.

In addition, by respectively using the color coating composition and clear coating composition prepared by mixing the components above in suitable content ratio, the multilayer coating film may be formed. This multilayer coating film may prevent discoloration due to light (e.g. UV light), water permeation and the like and may enhance durability against abrasion, scratches and the like.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of producing a multilayer coating film, comprising:
    providing a cork layer;
    preparing a color coating composition and a clear coating composition;
    coating the color coating composition on the cork layer to form a color coating film; and
    coating the clear coating composition on the color coating film to form a clear coating film,
    wherein the color coating composition comprises an amount of about 30 to 50% by weight of a waterborne polyurethane resin, an amount of about 10 to 30% by weight of a waterborne acrylic resin, an amount of about 0.3 to 5% by weight of a coloring pigment, an amount of about 0.1 to 1.0% by weight of a wetting agent, an amount of about 0.1 to 2.0% by weight of a defoaming agent, an amount of about 0.01 to 1.0% by weight of a hardening accelerator, an amount of about 0.5 to 5.0% by weight of a first light stabilizer, an amount of about 0.1 to 3.0% by weight of a thickener, and an amount of about 5 to 30% by weight of a first solvent, all the % by weight based on the total weight of the color coating composition, and
    wherein the clear coating composition comprises an amount of about 20 to 40% by weight of an acrylic resin, an amount of about 5 to 15% by weight of a polyester polyol, an amount of about 0.1 to 1.5% by weight of a reaction catalyst, an amount of about 0.1 to 1.0% by weight of a wetting additive, an amount of about 1.0 to 2.0% by weight of a second light stabilizer, an amount of about 1.0 to 5.0% by weight of a quencher, an amount of about 10 to 20% by weight of a hardener, and an amount of about 25 to 30% by weight of a second solvent, all the % by weight based on the total weight of the clear coating composition,
    wherein the waterborne polyurethane resin comprises an amount of about 5 to 30% by weight of isocyanate, an amount of about 2 to 10% by weight of hydrophilic polyol, an amount of about 30 to 60% by weight of polycarbonate diol, an amount of about 5 to 25% by weight of a solvent, and an amount of about 1 to 5% by weight of a neutralizer, all % by weights based on the total weight of the waterborne polyurethane resin,
    wherein the waterborne acrylic resin comprises an amount of about 50 to 80% by weight of a methacrylic monomer having an aliphatic group, an amount of about 5 to 20% by weight of a methacrylic monomer having a hydroxyl group, an amount of about 3 to 10% by weight of a methacrylic monomer having an acid radical, and an amount of about 10 to 20% by weight of an acrylic monomer, all the % by weight based on the total weight of the waterborne acrylic resin,
    wherein the wetting agent is one or more selected from the group consisting of siloxane modified with polyether, a polyether-siloxane copolymer, polydimethyl siloxane, and polydimethylsiloxane modified with polyether,
    wherein the hardening accelerator is one or more selected from the group consisting of trimethylene diamine, stannous octoate, dibutyltin dilaurate, and lead 2-ethylhexonate,
    wherein the light stabilizer of the color coating composition is one or more selected from the group consisting of benzophenones, oxanilides, benzotriazoles, triazines, 4-benzoyloxy-2,2,6,6-tetramethylpiperidin, and 2,4-di-tert-butylphenyl-3,5-di-tert-butyl-hydroxybenzoid,
    wherein the thickener is one or more selected from the group consisting of acrylic thickeners, urethane, and ethylene-vinyl acetate,
    wherein the acrylic resin of the clear coating composition has an acid value of about 3 to 10 mg/KOH, comprises a hydroxyl group in a content of about 1 to 3%, and has a glass transition temperature of about 40 to 50° C. and a weight-average molecular weight (Mw) of about 6,000 to 15,000,
    wherein the polyester polyol comprises a hydroxyl group in a content of about 4 to 6% and has a weight-average molecular weight (Mw) of about 3,000 to 10,000,
    wherein the reaction catalyst is dibutyltin dilaurate,
    wherein the wetting additive is a polydimethylsiloxane-based material.

2. The method of claim 1, wherein a thickness of the color coating film is of about 5 to 10 µm and a thickness of the clear coating film is of about 25 to 35 µm.

* * * * *